United States Patent [19]
Winkler et al.

[11] 3,784,292
[45] Jan. 8, 1974

[54] BATTERY TEST ARRANGEMENT IN A MOTION PICTURE CAMERA

[75] Inventors: Alfred Winkler; Richard Pelte; Theodor Huber, all of Munich; Helmut Mayr, Taufkirchen, all of Germany

[73] Assignee: Agfa-Gevaert Aktiengesellschaft, Leverkusen, Germany

[22] Filed: Sept. 20, 1972

[21] Appl. No.: 290,995

[30] Foreign Application Priority Data
Sept. 21, 1971 Germany............... P 21 47 073.5

[52] U.S. Cl.............................. 352/170, 352/171
[51] Int. Cl. ........................................ G03b 17/20
[58] Field of Search....................... 352/170, 171; 340/249

[56] References Cited
UNITED STATES PATENTS
3,583,800  6/1971  Hirata................................. 352/170

OTHER PUBLICATIONS

"Checking the Batteries", P. 24, Bauer C-Royal Instruction Manual, obtained by Examiner around 5/71.

Primary Examiner—Samuel S. Matthews
Assistant Examiner—Russell E. Adams, Jr.
Attorney—Michael S. Striker

[57] ABSTRACT

Connected in parallel with the electromotor driving the film transport is a threshold circuit which causes an indicator lamp to light when the voltage applied thereto is too low. A single switch connects both the threshold circuit and the electromotor to the battery, causing the battery to be tested under actual operation. Contacts which are closed at the end of the film can be interconnected with the threshold circuit to cause the lamp to light at film end.

7 Claims, 1 Drawing Figure

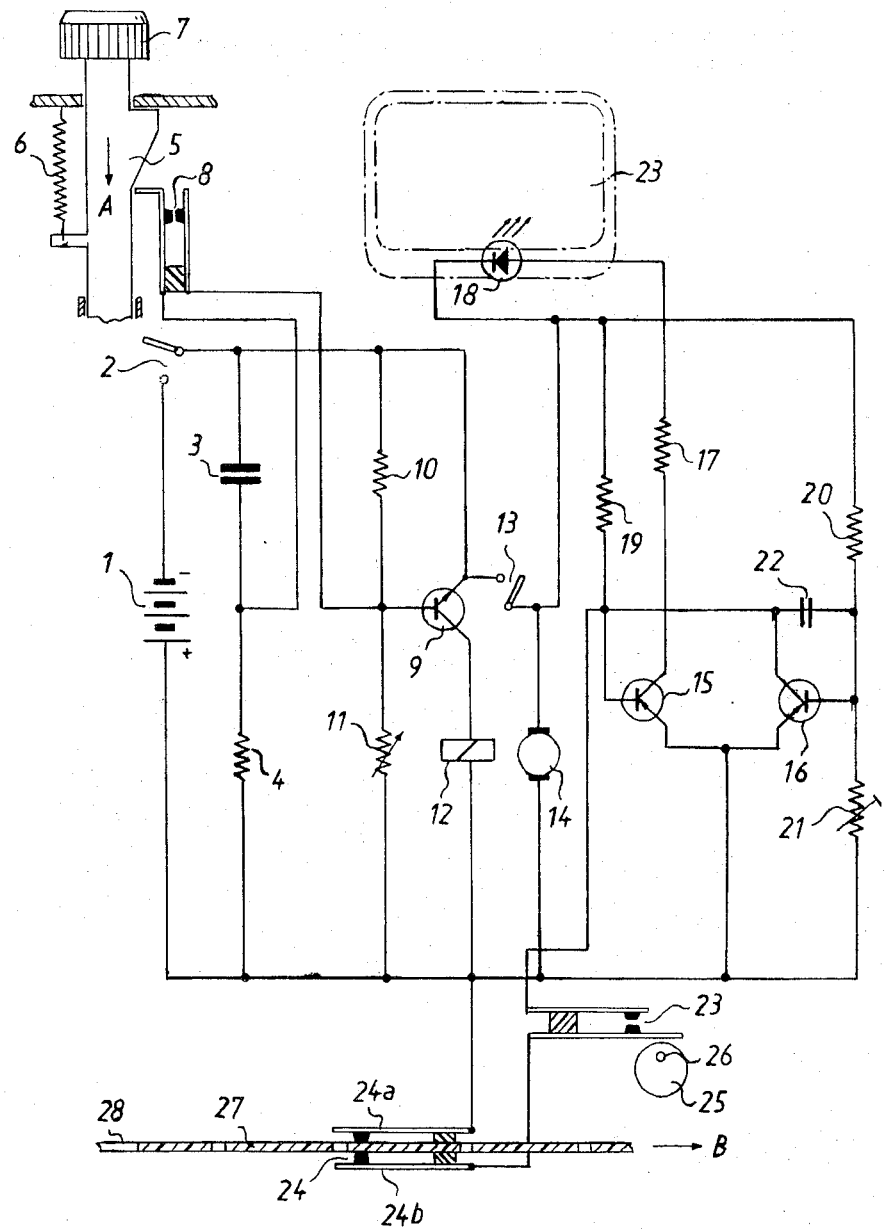

BATTERY TEST ARRANGEMENT IN A MOTION PICTURE CAMERA

BACKGROUND OF THE INVENTION

The present invention relates to motion picture cameras having battery means which supply energy to an electromotor which in turn drives the film transport. The electric circuit of the electromotor is connected to the battery by means of a relay contact. Further, the conventional motion picture cameras have a battery voltage test arrangement.

However, in the known motion picture cameras, the battery testing takes place under static conditions, that is when the motor is standing still. In order to simulate the motor load, a load is supplied to the battery which replaces said motor. In general, this load resistor is so chosen that it corresponds to the maximum dynamic load of the motor on the battery. Thus the battery is tested under only one particular load condition. Further, in the known motion picture cameras, a particular separate key or button must be provided for battery testing. This testing is not carried out continually.

SUMMARY OF THE INVENTION

The object of the present invention to furnish a battery test arrangement which does not require a separate activating key or button and which is activated by the camera release to test the battery during the operation of the motor.

The present invention thus comprises a battery test arrangement in a motion picture camera, where said motion picture camera has an electromotor, battery means having a battery output voltage for supplying energy to said electromotor and switch means connecting said electromotor to said battery when closed. The battery test arrangement comprises threshold circuit means responsive to an applied voltage for furnishing an output signal when said applied voltage is less than a predetermined voltage. Indicator means are connected to said threshold circuit means for furnishing an indicator output in response to said output signal. Finally, connecting means directly connect said threshold circuit means in parallel with said electromotor in such a manner that said switch means connect both said electromotor and said threshold circuit means to said battery means when closed, whereby said battery output voltage constitutes said applied voltage and said indicator means furnish said indicator output signal when said battery output voltage is less than said predetermined voltage.

The predetermined voltage is, of course, so chosen that it corresponds to the minimum voltage permissible as battery output voltage.

In a preferred embodiment of the present invention the indicator means is an indicator lamp or, alternatively, a luminescent diode.

In those motion picture cameras in which the battery test arrangement is used to indicate the end of the film, contact means which are closed following the end of the film are interconnected with the threshold means in such a manner that the indicator lamp lights when said contact means are closed. Further, to differentiate the indicator lamp output signifying film end with that signifying a low battery voltage, a pair of interrupter contacts is connected in series with film end indicator contact, thereby periodically interrupting the connection to the threshold circuit, causing a flickering indicator output light. The interrupter contact may be driven through an eccentric which in turn is driven by the electromotor or there may be periodically closed by the film grip. Thus, if the indicator lamp lights steadily during the showing of the film, it constitutes a definite indication that the battery voltage is too low, while a flickering indicator light indicates that the end of the film has arrived.

In a preferred embodiment of the present invention the threshold circuit means comprises voltage divider means connected in parallel with the electromotor. The voltage divider means has a voltage divider tap to which is connected the base of the first transistor means. Second transistor means have an emitter-base circuit connected in paralled with the emitter-collector circuit of the first transistor means. The collector of the second transistor means is connected to the indicator means. The voltage at the voltage divider tap is so chosen that the first transistor means are conductive when the battery output voltage is a voltage exceeding a predetermined voltage, thereby causing the second transistor means to be blocked which in turn causes the indicator lamp to be extinguished. When the battery voltage falls below the perdetermined voltage, the first transistor means are blocked, causing the second transistor means to become conductive and the indicator lamp to light.

Since batteries in general have the characteristic that the battery output voltage first sinks upon application of a load, the first transistor means would normally be blocked when the electromotor and the threshold circuit were connected to the battery. In order to prevent this initial blocking, a capacitor is connected between the base and the collector of said first transistor means. This causes the first transistor means to be blocked for a predetermined time following the application of load to the bettery. After said predetermined time the battery voltage has again reached the nominal value, if the battery is in operating condition, while the capacitor, having charged, no longer forces the first transistor means to the conductive state.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE shows the circuit arrangement in accordance with the present invention.

DESCRIPTION OF THE PREFERRED EMBODIMENT

The preferred embodiment of the present invention will now be described with reference to the drawing.

In the FIGURE, the battery means are indicated by reference numeral 1. An operating switch 2 connects the battery to an amplifyer circuit which comprises a capacitor 3 connected in series with a resistor 4. A release slide 5, which operates against the force of a spring 6 and is externally activatable via a button 7 closes a contact 8. This contact 8 connects capacitor 3 with the base of a transistor 9. The base of transistor 9 is connected to a voltage divider comprising two resistors, 10 and 11. The voltage divider 10, 11 is so adjusted that, when contact 8 is open, transistor 9 is blocked. The coil of a relay 12 is connected into the collector circuit of transistor 9. Relay 12 activates a contact 13. Contact 13 in turn connects the DC motor 14 to the negative side of battery 1.

A battery test arrangement is connected in parallel to a DC motor 14. This battery test arrangement comprises a threshold circuit means which comprise first transistor means 16 and second transistor means 15. The transistors together constitute amplifier means. The emitters of transistor 15 and 16 are connected in common to the postive side of battery 1. A series circuit comprising a resistance 17 and a luminescent dial 18 is connected into the collector circuit of transistor 15. The collector of transistor 15 is herein referred to as the output of the amplifier means. The base of transistor 15 is connected to switch 13 via a resistor 19. Further, the base of transistor 15 is connector to the collector of transistor 16. The base of transistor 16 (herein referred to as a control element) is connected to the voltage divider tap of voltage divider means comprising resistors 20 and 21. The resistance values of resistors 20 and 21 are so chosen that the base emitter voltage of transistor 16 is larger than the threshold value required to cause transistor 16 to become fully conductive when the battery output voltage is higher than the predetermined voltage and is lower than the threshold voltage when the battery output voltage is less than the predetermined voltage. That is, when the battery output voltage has the lowest acceptable value, transistor 16 is conductive, while it is blocked when the battery output voltage is less than the predetermined voltage. A capacitor 22 is connected between the base and the emitter of transistor 16.

Reference numeral 23 refers to a viewfinder in which the luminescent diode is positioned.

The base of transistor 15 may further be directly connected to the positive side of the battery by means of a contact 23 connected in series with a contact 24. Contact 23 is periodically activated by means of an eccentric 25 which is rotatable about an axis 26. This eccentric 25 is connected to the film transport means, the connection not being shown in this FIGURE. Contact 24 has two contact springs 24a and 24b. Contact 24 is open when a film 27 is between contacts 24a and 24b. After the trailing edge of the film has passed, contact 24 is closed.

The above-described arrangemennt operates as follows: First, let it be assumed that the battery output voltage is larger than the predetermined voltage. Closing of contact 2 causes capacitor 3 to charge through resistor 4. If now the photographer operates the release slide 7 in the direction indicated by arrow A the release contact 8 is closed. Capacitor 3 discharges through resistor 10. This current pulse causes transistor 9 to become fully conductive, activating relay coil 12. Relay 12 causes contact 13 to close, connecting electromotor 14 to battery 1. At the same time energy is applied to the battery test arrangement.

At the moment at which the circuit is connected to the battery, capacitor 22 acts as a short circuit, directly connecting the collector to the base of transistor 16. Thus transistor 16 is fully conductive at the moment at which voltage is applied. If capacitor 22 were not in the circuit, the decrease of battery output voltage upon closure of switch 13 would cause transistor 16 to block, causing the luminescent diode 18 to emit light for a short period of time.

Eccentric 25 causes contact 23 to close periodically. However, this does not in any way effect the indicator circuit since contact 24 is open as long as film 27 passes between contact member 24a and 24b. Only when the trailing edge 28 of the film has passed contact 24 does this contact close, causing the luminescent diode 18 to emit light synchronously with the closing of contact 23.

Now let it be assumed that the battery voltage is less than the predetermined voltage. As described above, the closing of contact 8 is followed by the activation of relay 12 and the closing of contact 13. The DC motor 14 starts to turn. However, the voltage developed across resistor 21 is now less than the predetermined voltage, that is less then the threshold voltage for causing transistor 16 to become conductive. Transistor 16 is therefore blocked. This causes transistor 15 to become conductive, in turn causing a current to flow from the positive side of the battery via the emitter-collector circuit of transistor 15, resistor 17, luminescent diode 18, and via contact 13 into the negative side of battery 1. Thus the luminescent diode 18 glows and indicates to the user of the camera that the battery voltage is less than the acceptable minimum battery output voltage.

Transistor 16 does not block immediately upon closing of contact 13, since capacitor 22 first causes it to be conductive. However this delay is very short and depends upon the value of capacitor 22 and resistor 20. Other than this very short delay, the circuit operates in the above-described manner.

While the invention has been illustrated and described as embodied in specific threshold circuit means, it is not intended to be limited to the details shown, since various modifications and structural and circuit changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

We claim:

1. In a moving picture camera having an electromotor, battery means having a battery output voltage for supplying energy to said electromotor and switch means connecting said electromotor, to said battery means when closed, a battery test arrangement, comprising, in combination, threshold circuit means responsive to an applied voltage for furnishing an output signal when said applied voltage is less than a predetermined voltage, said threshold circuit means comprising voltage divider means connected in parallel with said electromotor and having a voltage divider tap, and amplifier means having a control element connected to said voltage divider tap and an output circuit for furnishing said output signal; indicator means connected to said threshold circuit means for furnishing an indicator output in response to said output signal; and connecting means directly connecting said threshold circuit means in parallel with said electromotor in such a manner that said switch means connect both said electromotor and said threshold circuit means to said battery means when closed, whereby said battery output voltage constitutes said applied voltage and said indicator means furnish said indicator output signal when said battery output voltage is less than said predetermined voltage.

2. An arrangement as set forth in claim 1, wherein said amplifier means comprise first transistor means having a base connected to said voltage divider tap and an emitter-collector circuit, and second transistor means having an emitter-base circuit connected in parallel with said emitter-collector circuit of said first transistor means, and a collector connected to said indicator means.

3. In a moving picture camera having an electromotor, battery means having a battery outpput voltage for supplying energy to said electromotor and switch means connecting said electromotor to said battery means when closed, a battery test arrangement, comprising, in combination, threshold circuit means responsive to an applied voltage for furnishing an output signal when said applied voltage is less than a predetermined voltage, said threshold circuit means comprising voltage divider means connected in parallel with said electromotor and having a voltage divider tap, first transistor means having a base connected to said voltage divider tap and an emitter-collector circuit, and second transistor means having an emitter-base circuit connected in parallel with said emitter-collector circuit of said first transistor means, and a collector; indicator means connected to said collector of said threshold circuit means, for furnishing an indicator output in response to said output signal; and connecting means directly connecting said threshold circuit means in parallel with said electromotor in such a manner that said switch means connect both said electromotor and said threshold circuit means to said battery means when closed, whereby said battery output voltage constitutes said applied voltage and said indicator means furnish said indicator output signal when said battery output voltage is less than said predetermined voltage.

4. An arrangement as set forth in claim 3, wherein said indicator means comprise an indicator lamp.

5. An arrangement as set forth in claim 3, wherein said moving picture camera further comprises film transport means activated by said electromotor for transporting film along a predetermined path; further comprising contact means connected in parallel with said emitter-base circuit of second transistor means, positioned along said predetermined path for sensing the absence or presence of said film, said contact means short circuiting said emitter-base circuit of said second transistor means in the absence of said film, thereby activating said indicator means to furnish said indicator output.

6. An arrangement as set forth in claim 5, further comprising interrupter means connected in series with said contact means, for periodically interrupting the connection between said contact means and said emitter-base circuit of said second transistor means, thereby furnishing an interrupting indicator output.

7. An arrangement as set forth in claim 3, further comprising capacitance means connected between said base and said collector of said first transistor means.

* * * * *